United States Patent
Eggert et al.

(10) Patent No.: US 10,884,226 B2
(45) Date of Patent: Jan. 5, 2021

(54) METHOD FOR SCANNING MICROSCOPY AND SCANNING MICROSCOPE

(71) Applicant: Carl Zeiss Microscopy GmbH, Jena (DE)

(72) Inventors: Helge Eggert, Jena (DE); Michael Hilbert, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 664 days.

(21) Appl. No.: 15/186,236

(22) Filed: Jun. 17, 2016

(65) Prior Publication Data

US 2016/0299326 A1    Oct. 13, 2016

Related U.S. Application Data

(63) Continuation of application No. PCT/EP2014/078202, filed on Dec. 17, 2014.

(30) Foreign Application Priority Data

Dec. 17, 2013 (DE) .................. 10 2013 021 482

(51) Int. Cl.
G02B 21/00 (2006.01)
G02B 21/36 (2006.01)

(52) U.S. Cl.
CPC ....... *G02B 21/0032* (2013.01); *G02B 21/002* (2013.01); *G02B 21/004* (2013.01);
(Continued)

(58) Field of Classification Search
CPC ............. G02B 21/0032; G02B 21/002; G02B 21/004; G02B 21/0076; G02B 21/008; G02B 21/367
(Continued)

(56) References Cited

U.S. PATENT DOCUMENTS 6,028,306 A * 2/2000 Hayashi ............ G02B 21/0032
                                                        250/235
8,054,542 B2   11/2011 Sasaki et al.
(Continued)

OTHER PUBLICATIONS

International Search Report dated Mar. 31, 2015 of international application PCT/EP2014/078202 on which this application is based.
(Continued)

*Primary Examiner* — Sath V Perungavoor
*Assistant Examiner* — Kristin Dobbs
(74) *Attorney, Agent, or Firm* — Walter Ottesen, P.A.

(57) ABSTRACT

The invention relates to a method for scanning microscopy wherein a specimen is scanned simultaneously with a plurality of illumination spots of an excitation light. The light emitted by one specimen location irradiated with one illumination spot is detected independently of the light emitted by another specimen location illuminated with another illumination spot. A microscopic image of the specimen can be compiled from the emitted light detected for the different specimen locations. The method provides that the intensities of the different illumination spots are set independently of one another, and in that the illumination spots are guided over the specimen one after another in a scan line. The invention additionally relates to a scanning microscope.

17 Claims, 2 Drawing Sheets

(52) U.S. Cl.
CPC ....... *G02B 21/008* (2013.01); *G02B 21/0076* (2013.01); *G02B 21/367* (2013.01)

(58) Field of Classification Search
USPC .......................................... 348/79
See application file for complete search history.

(56) References Cited

U.S. PATENT DOCUMENTS

| | | |
|---|---|---|
| 2005/0012993 A1* | 1/2005 | Araya .................. G02B 21/002 359/385 |
| 2006/0120065 A1 | 6/2006 | Manders |
| 2007/0041090 A1 | 2/2007 | Graefe et al. |
| 2010/0208339 A1 | 8/2010 | Kleppe et al. |
| 2011/0278470 A1 | 11/2011 | Bouzid et al. |
| 2012/0257037 A1* | 10/2012 | Raicu .................... G02B 21/002 348/79 |
| 2014/0029091 A1 | 1/2014 | Kleppe et al. |
| 2014/0232848 A1 | 8/2014 | Schwedt et al. |
| 2015/0109432 A1 | 4/2015 | Dixon et al. |

OTHER PUBLICATIONS

International Preliminary Report on Patentability dated Jun. 30, 2016 of international application PCT/EP2014/078202 on which this application is based.

* cited by examiner

METHOD FOR SCANNING MICROSCOPY AND SCANNING MICROSCOPE

CROSS REFERENCE TO RELATED APPLICATIONS

This application is a continuation application of international patent application PCT/EP2014/078202, filed Dec. 17, 2014, and claiming priority from German application 10 2013 021 482.3, filed Dec. 17, 2013, and the entire content of both applications is incorporated herein by reference.

FIELD OF THE INVENTION

The present invention relates to a method for scanning microscopy and to a scanning microscope.

BACKGROUND OF THE INVENTION

In a method of the generic type, a specimen is scanned simultaneously with a plurality of illumination spots of an excitation light, and the light emitted by one specimen location irradiated with one illumination spot is detected independently of the light emitted by another specimen location illuminated with another illumination spot. A microscopic image of the specimen can be compiled from the emitted light detected for the different specimen locations.

A scanning microscope of the generic type comprises the following component parts: a light source for emitting excitation light, an optical separating device for spatially separating the excitation light into a plurality of illumination beams for a plurality of illumination spots, optical means for guiding the excitation light onto a specimen and for guiding light emitted by the specimen onto a detector unit, a scanning device for scanning the specimen with the plurality of illumination spots, and the detector unit for separately detecting the light emitted by the specimen locations illuminated by the different illumination spots.

Such a method of the generic type and such a scanning microscope of the generic type are described for example in U.S. Pat. No. 6,028,306.

In scanning microscopy methods requiring more than one recording, the image recordings are customarily carried out temporally successively using the same excitation beam. In this case, either complete images or individual lines are recorded successively using the same excitation spot. In the case of so-called HDR microscopy (High Dynamic Range Microscopy), for example, three successive images with three different excitation intensities are recorded and subsequently computed with one another. Owing to the finite recording speed, in this case, in comparison with a method in which only one image is recorded, the temporal resolution is worsened or, in other words, the temporally resolvable specimen dynamic characteristic is restricted.

The dynamic range of present-day photodetectors, particularly for laser scanning microscopy, is often inadequate to resolve simultaneously firstly very fine and dark structures and secondly very bright image regions equally sensitively. In fluorescence microscopy, therefore, parts of the image are often overmodulated and/or other parts are no longer distinguishable from the background noise.

Furthermore, the photodamage of cells and tissue as a result of intensive illumination heretofore has been one of the key factors which crucially limits the number of possible image recordings of living cells and hence the measurement time.

In the field of laser scanning microscopy, the limits of what is feasible are thus often encountered when the minimization of bleaching effects and optimization of the detector modulation are involved. Although these problems are addressed particularly well with the principle of photon counting, the advantages of a high signal-to-noise ratio are bought here at the expense of a comparatively low dynamic range. The counting becomes nonlinear starting from counting rates of approximately 10 MHz and is also virtually impossible to correct starting from approximately 30 MHz. Therefore, a user must constantly keep the illumination of the specimen in an optimum range, not least in order to protect the photomultiplier operated at maximum high voltage from being destroyed.

There are essentially three techniques available nowadays for extending the dynamic range. Firstly, it is possible to use better detectors, that is, for example cameras having an extremely high dynamic range. However, dynamic range depths of 16 bits nowadays for microscopy have scarcely been achieved heretofore. The use of high-sensitivity CCD cameras having an extremely large dynamic range is scarcely employed in laser scanning microscopy on account of stray light.

The problem of inadequate dynamic range can furthermore be circumvented in a comparatively simple form with a plurality of images which are recorded with different exposure and are subsequently computed. The disadvantage of this method is not only the significantly greater specimen loading, but also the recording time required. This is not possible or at any rate not optimal for many applications, particularly in measurements on living cells.

Finally, a method designated as "Controlled Light Exposure Microscopy", also abbreviated to CLEM, was proposed in United States patent application publication 2006/0120065. For laser scanning microscopy, in this case, the exposure time is controlled with pixel accuracy during the scanning image recording in a fast feedback control by a procedure in which when a specific threshold value is reached in the detector, the illumination for the respective pixel is switched off and the exposure is thus terminated.

There have been two approaches heretofore for so-called DI microscopy (Dynamic Illumination microscopy). In a first method variant, a complete image of a specimen or of a specimen region is recorded and, on the basis of the image, a specific excitation intensity is subsequently calculated for each individual pixel. With this calculated intensity, the relevant pixel is then illuminated in a second recording of the specimen or of the specimen region. Two recordings are necessary in this method, for which reason here, too, the temporal resolution is worsened and the possibilities of observing rapidly variable processes in a living biological specimen are accordingly restricted.

In a second embodiment variant of DI microscopy, an intensity of the light emitted by a specimen location is used directly as feedback for a control of the intensity incident on precisely this specimen location. This necessitates a very fast control, in particular in order to avoid a saturation of the detectors used. This is described for example in United States patent application publications 2010/0208339 and 2014/0029091.

SUMMARY OF THE INVENTION

It is an object of the invention to provide a method for scanning microscopy and a scanning microscope which can be used advantageously in particular for HDR and DI microscopy.

The method of the invention is directed to scanning microscopy including the steps of: scanning a specimen simultaneously with a plurality of illumination spots of an excitation light wherein the illumination spots correspond to respective locations on the specimen; establishing the light emitted from one of the specimen locations independently from the light emitted from another one of the specimen locations illuminated by another one of the illumination spots; assembling a microscopic image of the specimen for the emitted light established for the different specimen locations; adjusting the intensities of corresponding ones of the illumination spots independently of one another; and, guiding the illumination spots over the specimen one behind the other along a scan line.

The method of the type mentioned above is developed according to the invention in that the intensities of the different illumination spots are set independently of one another, and the illumination spots are guided over the specimen one after another in a scan line.

The microscope of the type mentioned above is developed according to the invention in that setting means for independently setting the intensities of the illumination beams are present, and the separating device and the scanning device for scanning the specimen are configured in such a way that the illumination spots are guided over the specimen one after another in a scan line.

It may be regarded as a first basic concept of the present invention that the excitation or illumination spots are no longer guided in different lines over a specimen or a specimen region, but rather are caused to run one after another in the same line. In this case, the separate illumination spots are provided with the aid of an optical separating device which separates the excitation light of the light source into a plurality of illumination beams. It is additionally essential to the invention that the intensity emitted by specimen locations adjacent to one another, namely adjacent to one another in the same scan line, is detected in each case independently.

Excitation light within the meaning of the invention described here is electromagnetic radiation, which is taken to mean in particular the infrared, visible and ultraviolet parts of the spectrum. In principle, all sources which provide the desired electromagnetic radiation with sufficient intensity may be used as light sources. Lasers are usually used for this purpose. In principle, however, light emitting diodes or other illuminants may also be used.

In principle, all detectors which detect the light reflected back from the specimen sufficiently effectively and with a sufficiently good signal-to-noise ratio may be used as detectors. In principle, semiconductor detectors may also be used for this purpose. Since the main application of the present microscopy techniques is fluorescence microscopy, where the counting rates generally are comparatively low, photomultipliers are usually used.

In a first particularly preferred embodiment variant of the method according to the invention, a leading illumination spot, which may also be referred to as a pilot spot, and a trailing illumination spot are guided over the specimen and an intensity of the light reflected back from or emitted by a specimen location that is measured for the leading illumination spot is used for setting an intensity of the trailing illumination spot if the trailing illumination spot impinges on the specimen location.

Accordingly, at least two illumination spots are used which are scanned at a, more particularly constant, distance over the same line of the specimen. In this case, the brightness of the second, that is, the trailing, illumination spot is controlled in accordance with the basic concept of dynamic illumination microscopy on the basis of the response signal generated by the first illumination spot, that is, the light reflected back from the respective specimen location, of the specimen. All advantages of the DIM method can then be achieved for the image recorded with the second illumination spot. By way of example, the detectors can be operated in a targeted manner in a range where the signal-to-noise ratio is particularly high and, moreover, bleaching of the colorants can be reduced to a minimum.

What is particularly important for this method variant is that the intensity of each individual illumination spot is set independently. According to the invention, therefore, the setting means for separately setting the intensities of the different illumination spots are present.

In particular, drivable components, for example acousto-optical elements, such as AOMs, AODs and/or AOTFs, may be used as setting means.

In a further particularly advantageous variant of the method according to the invention, more than two, in particular three, illumination spots are guided over the specimen, and the intensity of the illumination spots rises from a leading or first illumination spot to a last illumination spot. This method variant enables the recording of microscopic images with a particularly high intensity dynamic range. This technique is referred to as HDR microscopy, as explained above.

What is important for all variants according to the invention is the possibility of generating two or more excitation beams which differ in the angle in the fast scanning direction in a back focal plane of an objective used. That is, in other words that the illumination spots in one and the same scan line rapidly succeed one another. The intensity of the excitation beams, which are also referred to as illumination beams, may be set independently of one another according to the invention.

The intensities of the different illumination spots may be set differently, and in particular fixedly, in particular for HDR microscopy. For this purpose, beam splitters and/or beam attenuators may be used as setting means for separately setting the intensities of the different illumination spots.

In principle, different scanning devices and different optical units may be used for generating the plurality of illumination spots. Particularly preferably, however, in each case the same microscope objective and the same scanning device are used for guiding the different illumination spots onto the specimen.

In principle, the separating device for spatially separating the excitation light into a plurality of illumination beams may be positioned at any location of the excitation beam path. Particularly preferably, the separating device is arranged in the beam path between the light source and the scanning device.

The image data obtained with the plurality of illumination spots may expediently be computed to form a common image.

What is essential to the present invention is the generation of a plurality of illumination or excitation spots adjacent to one another in a scan line, wherein the light emitted by the specimen locations illuminated with the illumination spots can be detected independently of one another. In particular, according to the invention, the different illumination spots may additionally be set independently of one another in terms of their intensity.

For the application example of HDR microscopy by scanning a plurality of successive illumination spots in the same scan line of a specimen, it is possible to accelerate the image recording overall by a factor corresponding to the number of illumination spots. Processes in a living biological specimen can therefore be observed with a correspondingly greater temporal dynamic range. For such measurements, for the intensity ratios of the individual illumination spots it is merely necessary to ensure that the leading beam has the lowest intensity and the intensities of the illumination beams that follow in the scan line become greater from beam to beam. This may be realized for example by means of beam splitters and beam attenuators.

For the application example of dynamic illumination microscopy, the spatial and thus also temporal distance between the leading illumination spot, which is also referred to as pilot spot or pilot beam, and the trailing illumination spot is used to calculate the intensity to be set for the second illumination spot if the second illumination spot impinges on the corresponding specimen location. In other words, therefore, on the basis of the specimen response of a specific specimen location after irradiation with the leading illumination spot, an intensity for the second illumination spot is calculated if the latter is incident on the specimen location.

The requirement made of the speed of the control can therefore be reduced with the method according to the invention and this requirement is at any rate lower than for a situation in which the illumination intensity is intended to be readjusted still during a residence duration of an illumination spot on a specimen location. With a rate of x pixels/microsecond and a distance between the two excitation spots in the scan line of y pixels, a time which a signal is permitted to need to pass through the control system will be approximately y/x. In comparison therewith, this time in the case of a direct control is less than 1/x and is accordingly lower by a factor of y.

The microscope according to the invention, which is suitable in particular for carrying out the method according to the invention, may be a confocal microscope. By way of example, the detector unit may have confocal detectors. A detector is referred to as confocal if it itself or a stop upstream of the detector is positioned in or in proximity to a confocal plane. The term confocal plane denotes a plane of the detection beam path which is optically conjugate with respect to a specimen-side focal plane of the microscope objective. A stop arranged in a confocal plane, for example upstream of a detector, restricts the light capture of the detector to a small target volume at the specimen location. Correspondingly, for a confocal light source, the illumination of the specimen is restricted to a small target value on or in the specimen.

BRIEF DESCRIPTION OF THE DRAWINGS

The invention will now be described with reference to the drawings wherein.

Figure 1:
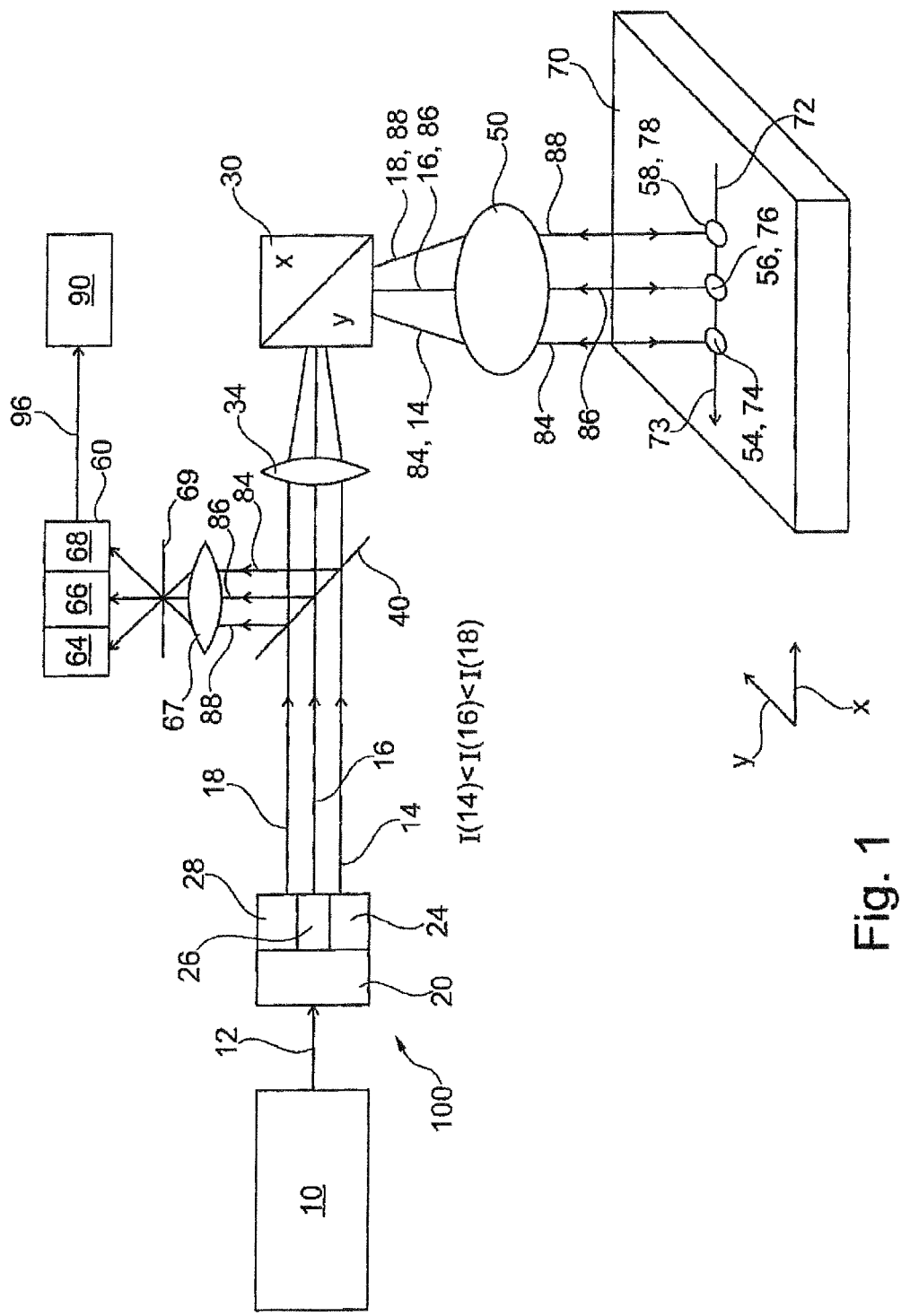
FIG. 1 shows a first embodiment of a scanning microscope according to the invention; and, FIG. 2 shows a second embodiment of a scanning microscope according to the invention.

DESCRIPTION OF THE PREFERRED
EMBODIMENTS OF THE INVENTION

A first embodiment of a method according to the invention and of a scanning microscope 100 according to the invention is explained with reference to FIG. 1. A light source 10, in particular a laser, for emitting excitation light 12, optical means (20, 30, 40, 50) and also a detector unit 60 are shown therein as essential components.

As part of the optical means, firstly an optical separating device 20 is present, which separates the excitation light 12 into a plurality of illumination beams (14, 16, 18), wherein the illumination beams (14, 16, 18) serve for generating a plurality of different illumination spots (54, 56, 58) on a specimen 70.

A further component part of the optical means is a main chromatic splitter 40, through which the illumination beams (14, 16, 18) pass. Thereafter, the illumination beams (14, 16, 18) pass via an optical unit 34 onto a scanning device 30, by which they are scanned over the specimen 70 according to the invention such that the illumination spots (54, 56, 58), as illustrated schematically in FIG. 1, are guided over the specimen 70 alongside one another or, synonymously, one after another in a scan line 72. In the example shown in FIG. 1, the scanning direction is the negative x-direction, which is shown on the basis of the schematically illustrated coordinate system.

By means of a microscope objective 50, the illumination spots (54, 56, 58) are then focused onto or into the specimen and illuminate specimen locations (74, 76, 78) there, as shown in FIG. 1. In reaction to the incident excitation light, light (84, 86, 88) is emitted by the specimen locations (74, 76, 78) and is guided via the same microscope objective 50 back onto the scanner 30 and the main chromatic splitter 40.

For the important application of fluorescence microscopy, the fluorescent light reflected back generally has longer wavelengths than the excitation light. The main chromatic splitter 40 is constituted such that light of the higher wavelengths is reflected. The light (84, 86, 88) emitted by the specimen locations (74, 76, 78) is accordingly forwarded with the aid of the optical unit 67 in the direction of a confocal diaphragm 69 and the detector unit 60.

In the detector unit 60, a separate detector (64, 66, 68) is present for each of the illumination spots (54, 56, 58), such that the emitted light (84, 86, 88) of the specimen 70 that is generated by the illumination spots (54, 56, 58) can be detected separately in each case for each illuminated specimen location (74, 76, 78). A single confocal diaphragm 69 is positioned upstream of the detectors (64, 66, 68) in the embodiment shown, such that the arrangement 100 illustrated in FIG. 1 is suitable overall for carrying out confocal microscopy. In principle, a separate confocal diaphragm may also be arranged upstream of each individual detector (64, 66, 68).

What is essential to the present invention in the embodiment of FIG. 1 is that the specimen 70 is scanned simultaneously with a plurality of illumination spots (54, 56, 58), wherein the illumination spots (54, 56, 58) are guided over the specimen in one and the same scan line 72. What is important and essential for the invention, moreover, is that the intensities of the different illumination spots can be set independently of one another. In the embodiment shown, the intensity I(54) of the illumination spot 54 is less than the intensity I(56) of the illumination spot 56, which is in turn less than the intensity I(58) of the illumination spot 58.

These magnitude relations are represented in FIG. 1 by the inequality I(14)<I(16)<I(18).

This choice of the intensities of the individual illumination spots (54, 56, 58) can advantageously reduce bleaching of the colorants to a minimum and it is possible to achieve microscopic images with a very high brightness dynamic. This method is referred to as HDR microscopy. The suitable setting of the intensities is effected with the aid of setting means (24, 26, 28) illustrated schematically in FIG. 1, which are disposed downstream of the separating device 20 and attenuate the illumination beams (14, 16, 18) to the desired intensity. This may be done in principle with the aid of beam splitters or beam attenuators. To achieve the advantage of bleaching reduction that is desired for HDR microscopy, it is important for the first or leading illumination spot 54 in the scanning direction to have the lowest intensity and the last illumination spot 58 to have the highest intensity. FIG. 1 illustrates the scanning direction along the scan line 72 by an arrow 73.

The detector unit 60 is connected to a control and evaluation unit 90, which is illustrated schematically by an arrow 96 in FIG. 1. In the control and evaluation unit 90, for example, the measurement data supplied by the detectors (64, 66, 68) can be computed to form a single image. In principle, the control and evaluation unit 90 may be operatively connected to the setting means (24, 26, 28), which may in particular also be drivable components, for example acousto-optical components.

A further embodiment of a scanning microscope according to the invention, which is suitable for carrying out DI microscopy (Dynamic Illumination Microscopy), is explained with reference to FIG. 2. The essential component parts of the scanning microscope 100 shown therein correspond to those of the first embodiment shown in FIG. 1. In general, identical or identically acting component parts are identified by the same reference numerals in the figures.

Figure 2:
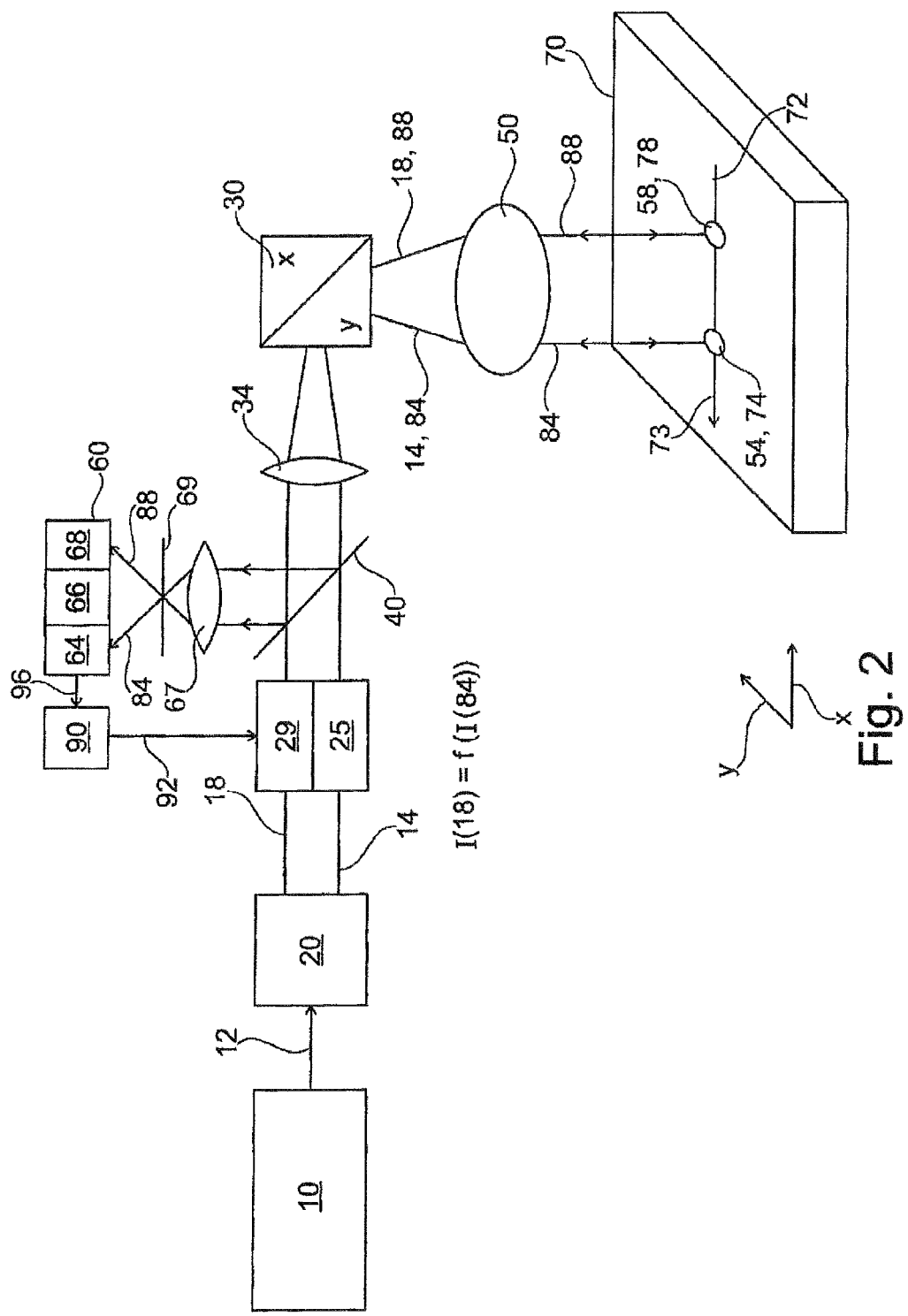

In a departure from the variant of a scanning microscope 100 shown in FIG. 1, in FIG. 2 only two illumination spots, namely a leading illumination spot 54 and a trailing illumination spot 58, are guided over the specimen 70 in one and the same scan line 72. Accordingly, in this example, the detector unit 60 has only two detectors (64, 68), with a confocal diaphragm 69 positioned upstream thereof. In principle, as in the embodiment of FIG. 1, it is possible here, too, for each detector to have a dedicated confocal diaphragm and/or a dedicated detector optical unit.

The measurement information of the detector unit 60, that is, the measurement information items of the detectors (64, 68), are fed to a control and evaluation unit 90, which is shown schematically by the arrow 96 in FIG. 2. The measurement information supplied by the detector 64 corresponds to the light 84 emitted by or reflected back from the specimen location 74 illuminated by the leading illumination spot 54, in the situation illustrated in FIG. 2, as a response to the illumination spot 54.

The control and evaluation unit 90, for supplying actuating signals, is operatively connected to a setting means 25 for the illumination beam 14 and to a setting means 29 for the illumination beam 18, which is illustrated by the arrow 92 in FIG. 2. On the basis of the measurement information supplied by the detector 64 for the specimen location 74, the control and evaluation unit 90 calculates a manipulated variable for the setting means 29, which sets the intensity of the illumination beam when the illumination beam 18 impinges as trailing illumination spot on the specimen location 74.

The setting means (25, 29) may preferably be acousto-optical setting means, such as AOM and AOTF. With the aid of AOTFs, in principle, the intensities of a plurality of colors can also be set in a targeted manner and rapidly. In comparison with known arrangements for DI microscopy, with the method described here the requirement made of the speed of the control can be reduced because the latter need no longer be so rapid that the control of the excitation intensity must be effected still during the residence duration of the excitation spot on a specific specimen location. On the other hand, the solution proposed here is significantly faster than the variants in which firstly a whole image of a specimen is recorded and afterward the specimen is subjected once again then to the calculated new point-specific intensities.

The fundamental functional dependence of the intensity I(18) of the illumination beam 18 on the intensity measured for the light 84 is represented in FIG. 2 by the equation $$I(18)=f(I(84)).$$

The present invention provides a scanning microscope and a method for scanning microscopy which, in particular for HDR microscopy and DI microscopy, enable considerable improvements and simplifications which can be realized with little outlay on apparatus.

The optical arrangements shown in FIGS. 1 and 2 are of exemplary nature. In variants with respect thereto, for example, the specimen could also be illuminated using transmitted light. Moreover, in principle, the relative arrangement of the specimen and the detector with respect to the main chromatic splitter 40 may be such that the illumination beams (14, 16, 18) are reflected by the main chromatic splitter 40; however, fluorescent light passes through the main chromatic splitter.

It is understood that the foregoing description is that of the preferred embodiments of the invention and that various changes and modifications may be made thereto without departing from the spirit and scope of the invention as defined in the appended claims.

LIST OF REFERENCE NUMERALS

10 Light source
12 Excitation light
14 Illumination beam
16 Illumination beam
18 Illumination beam
20 Optical separating device
24, 25, 26, 28, 29 Setting means for separately setting the intensity
30 Scanning device
34 Optical unit
40 Main chromatic splitter
50 Microscope objective
54 Illumination spot
56 Illumination spot
58 Illumination spot
60 Detector unit
64 Detector unit
66 Detector unit
67 Optical unit
68 Detector unit
69 Confocal diaphragm
70 Specimen
72 Scan line
73 Scanning direction
74 Specimen location
76 Specimen location
78 Specimen location
84 Light emitted by specimen location 74
86 Light emitted by specimen location 76
88 Light emitted by specimen location 78
20, 30, 40, 50 Optical means
90 Control and evaluation unit
92 Arrow
96 Arrow

What is claimed is:

1. A method directed to scanning microscopy comprising the steps of:
providing an excitation light and providing a plurality of illumination spots of the excitation light with the aid of an optical separating device which separates the excitation light into a plurality of illumination beams, wherein the excitation light is provided by a sole light source;
scanning a specimen simultaneously with the plurality of illumination spots of the excitation light wherein said illumination spots correspond to respective locations on said specimen;
establishing that the light emitted from one of said specimen locations is independent of the light emitted from another one of said specimen locations illuminated by another one of said illumination spots;
assembling a microscopic image of said specimen for the emitted light established for the different specimen locations;
adjusting the respective intensities of said illumination spots independently of one another;
guiding said illumination spots over said specimen one behind the other along a scan line with said scan line being one and the same scan line for all of said illumination spots,
wherein a leading illumination spot and a trailing illumination spot are guided over said specimen;
measuring a first intensity of light emitted from a specimen location for the leading illumination spot; and,
adjusting a second intensity of the trailing illumination spot when the trailing illumination spot impinges on said specimen location using said first intensity of the light for the leading illumination spot.

2. The method of claim 1, wherein said plurality of illumination spots is greater than two in number.

3. The method of claim 2, wherein said illumination spots are three in number.

4. The method of claim 2, wherein the intensity of the illumination spot from a leading illumination spot increases up to a last illumination spot.

5. The method of claim 2, wherein the intensities of the different illumination spots are adjusted differently.

6. The method of claim 2, wherein the intensities of the different illumination spots are fixedly adjusted.

7. The method of claim 1, wherein the measurement values, which are obtained for said illumination spots, are compiled to a common image.

8. The method of claim 1, wherein the same microscope and the same scanning device are used to guide each of the different illumination spots over the specimen.

9. A scanning microscope for carrying out a method directed to scanning microscopy, the scanning microscope comprising:
a light source for emitting an excitation light;
an optical separating device for spatially unraveling said excitation light from said light source into several illumination beams for respective illumination spots including a leading illumination spot and a trailing illumination spot;
a detector unit;
an optics unit for guiding said excitation light onto a specimen and for guiding light emitted from said specimen to said detector unit;
a scanning device for scanning said specimen with said illumination spots;
said detector unit being configured to separately establish the light emitted from the different specimen locations illuminated by the different illumination spots;
an adjusting device for independently adjusting the intensities of said illumination beams;
said optical separating device and said scanning device being configured so as to cause said illumination spots to be guided over said specimen one behind the other in a scan line with said scan line being one and the same scan line for all of said illumination spots;
wherein said light source is a sole light source for said several illumination beams;
said detector unit being further configured to measure an intensity of light emitted from a specimen location for the leading illumination spot; and,
said adjustment device being configured to use the intensity of light emitted to adjust a second intensity of light of the trailing illumination spot when the trailing illumination spot impinges on the specimen location.

10. The scanning microscope of claim 9, wherein:
said light source and said scanning device conjointly define a beam path; and,
said optical separating device is mounted in said beam path between said light source and said scanning device.

11. The scanning microscope of claim 9, wherein said adjusting device is at least one of a beam splitter and a beam attenuator.

12. The scanning microscope of claim 9, wherein said adjusting device includes driveable components.

13. The scanning microscope of claim 12, wherein said driveable components include acoustic components.

14. The scanning microscope of claim 13, wherein said acoustic components include AOTF, AOM and AOD.

15. The scanning microscope of claim 9, wherein said scanning microscope is a confocal scanning microscope.

16. The scanning microscope of claim 9, wherein said scanning microscope is configured to carry out the steps of method claim 1.

17. A method directed to scanning microscopy comprising the steps of:
providing excitation light from a single light source;
passing said excitation light to an optical separating device to obtain a plurality of illumination beams;
passing said plurality of illumination beams to a scanning device and scanning a specimen with said illumination beams as a plurality of corresponding illumination spots of excitation light wherein said illumination spots correspond to respective locations on said specimen;
designating one of said illumination spots as a pilot illumination spot and another one of said illumination spots as a trailing illumination spot;
adjusting the respective intensities of said pilot illumination spot and said trailing illumination spot independently of one another to cause the intensity of said pilot illumination spot to be less than the intensity of said trailing illumination spot to reduce bleaching of colorants to a minimum;
establishing that the light emitted from one of said specimen locations is independent of the light emitted from another one of said specimen locations illuminated by another one of said illumination spots;
assembling a microscopic image of said specimen for the emitted light established for the different specimen locations; and, guiding said illumination spots over said specimen one behind the other along a scan line with said scan line being one and the same scan line for all of said illumination spots;

wherein an intensity of light emitted from a first specimen location is measured for the pilot illumination spot; and, wherein the intensity of the light for the pilot illumination spot is used to adjust an intensity of the trailing illumination spot when the trailing illumination spot impinges on this specimen location.

\* \* \* \* \*